United States Patent
Lin et al.

(10) Patent No.: US 10,841,338 B1
(45) Date of Patent: Nov. 17, 2020

(54) DYNAMIC RULE RISK SCORE DETERMINATION IN A CYBERSECURITY MONITORING SYSTEM

(71) Applicant: Exabeam, Inc., San Mateo, CA (US)

(72) Inventors: Derek Lin, San Mateo, CA (US); Barry Steiman, San Ramon, CA (US); Domingo Mihovilovic, Menlo Park, CA (US); Sylvain Gil, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 265 days.

(21) Appl. No.: 15/945,462

(22) Filed: Apr. 4, 2018

Related U.S. Application Data

(60) Provisional application No. 62/481,778, filed on Apr. 5, 2017.

(51) Int. Cl.
*H04L 29/06* (2006.01)

(52) U.S. Cl.
CPC .................... *H04L 63/20* (2013.01)

(58) Field of Classification Search
CPC ...................................... H04L 63/20
See application file for complete search history.

(56) References Cited

U.S. PATENT DOCUMENTS

| | | | |
|---|---|---|---|
| 5,941,947 A | 8/1999 | Brown et al. | |
| 6,223,985 B1 | 5/2001 | DeLude | |
| 6,594,481 B1 | 7/2003 | Johnson et al. | |
| 7,668,776 B1 * | 2/2010 | Ahles | G06Q 20/108 235/379 |
| 8,326,788 B2 | 12/2012 | Allen et al. | |
| 8,443,443 B2 | 5/2013 | Nordstrom et al. | |
| 8,479,302 B1 | 7/2013 | Lin | |
| 8,539,088 B2 | 9/2013 | Zheng | |
| 8,606,913 B2 | 12/2013 | Lin | |
| 8,676,273 B1 | 3/2014 | Fujisake | |
| 8,881,289 B2 | 11/2014 | Basavapatna et al. | |
| 9,055,093 B2 | 6/2015 | Borders | |
| 9,081,958 B2 | 7/2015 | Ramzan et al. | |
| 9,189,623 B1 | 11/2015 | Lin et al. | |
| 9,680,938 B1 | 6/2017 | Gil et al. | |
| 9,692,765 B2 | 6/2017 | Choi et al. | |

(Continued)

OTHER PUBLICATIONS

Ioannidis, Yannis, "The History of Histograms (abridged)", Proceedings of the 29th VLDB Conference (2003), pp. 1-12.

(Continued)

*Primary Examiner* — Khoi V Le
(74) *Attorney, Agent, or Firm* — Lessani Law Group, PC

(57) ABSTRACT

The present disclosure relates to a cybersecurity-monitoring system, method, and computer program for dynamically determining a rule's risk score based on the network and user for which the rule triggered. The methods described herein addresses score inflation problems associated with the fact that rules have different false positive rates in different networks and for different users, even within the same network. In response to a rule triggering, the system dynamically adjusts the default risk points associated with the triggered rule based on a per-rule and per-user probability that the rule triggered due to malicious behavior. In certain embodiments, network context is also a factor in customizing the risk points for a triggered rule.

10 Claims, 3 Drawing Sheets

(56) References Cited

U.S. PATENT DOCUMENTS

| | | | |
|---|---|---|---|
| 9,760,240 | B2 | 9/2017 | Maheshwari et al. |
| 9,779,253 | B2 | 10/2017 | Mahaffey et al. |
| 9,798,883 | B1 | 10/2017 | Gil et al. |
| 9,843,596 | B1 | 12/2017 | Averbuch et al. |
| 9,898,604 | B2 | 2/2018 | Fang et al. |
| 10,095,871 | B2 | 10/2018 | Gil et al. |
| 10,178,108 | B1 | 1/2019 | Lin et al. |
| 10,419,470 | B1 | 9/2019 | Segev et al. |
| 10,467,631 | B2 * | 11/2019 | Dhurandhar ......... G06Q 20/102 |
| 10,474,828 | B2 | 11/2019 | Gil et al. |
| 10,496,815 | B1 | 12/2019 | Steiman et al. |
| 10,645,109 | B1 | 5/2020 | Lin et al. |
| 2002/0107926 | A1 | 8/2002 | Lee |
| 2003/0147512 | A1 | 8/2003 | Abburi |
| 2004/0073569 | A1 | 4/2004 | Knott et al. |
| 2006/0090198 | A1 | 4/2006 | Aaron |
| 2007/0156771 | A1 | 7/2007 | Hurley et al. |
| 2007/0282778 | A1 | 12/2007 | Chan et al. |
| 2008/0040802 | A1 | 2/2008 | Pierson et al. |
| 2008/0170690 | A1 | 7/2008 | Tysowski |
| 2008/0301780 | A1 | 12/2008 | Ellison et al. |
| 2009/0144095 | A1 | 6/2009 | Shahi et al. |
| 2009/0171752 | A1 | 7/2009 | Galvin et al. |
| 2009/0293121 | A1 | 11/2009 | Bigus et al. |
| 2010/0125911 | A1 | 5/2010 | Bhaskaran |
| 2010/0269175 | A1 | 10/2010 | Stolfo et al. |
| 2012/0278021 | A1 | 11/2012 | Lin et al. |
| 2012/0316835 | A1 | 12/2012 | Maeda et al. |
| 2012/0316981 | A1 * | 12/2012 | Hoover ................. G06Q 30/08 705/26.4 |
| 2013/0080631 | A1 | 3/2013 | Lin |
| 2013/0117554 | A1 | 5/2013 | Ylonen |
| 2013/0197998 | A1 | 8/2013 | Buhrmann et al. |
| 2013/0227643 | A1 | 8/2013 | Mccoog et al. |
| 2013/0305357 | A1 | 11/2013 | Ayyagari et al. |
| 2013/0340028 | A1 | 12/2013 | Rajagopal et al. |
| 2014/0315519 | A1 | 10/2014 | Nielsen |
| 2015/0046969 | A1 | 2/2015 | Abuelsaad et al. |
| 2015/0121503 | A1 | 4/2015 | Xiong |
| 2015/0339477 | A1 | 11/2015 | Abrams et al. |
| 2015/0341379 | A1 | 11/2015 | Lefebvre et al. |
| 2016/0005044 | A1 | 1/2016 | Moss et al. |
| 2016/0021117 | A1 | 1/2016 | Harmon et al. |
| 2016/0306965 | A1 | 10/2016 | Iyer et al. |
| 2016/0364427 | A1 | 12/2016 | Wedgeworth, III |
| 2017/0019506 | A1 | 1/2017 | Lee et al. |
| 2017/0024135 | A1 | 1/2017 | Christodorescu et al. |
| 2017/0155652 | A1 | 6/2017 | Most et al. |
| 2017/0161451 | A1 | 6/2017 | Weinstein et al. |
| 2017/0213025 | A1 | 7/2017 | Srivastav et al. |
| 2017/0236081 | A1 | 8/2017 | Grady Smith et al. |
| 2017/0318034 | A1 | 11/2017 | Holland et al. |
| 2018/0004961 | A1 | 1/2018 | Gil et al. |
| 2018/0048530 | A1 | 2/2018 | Nikitaki et al. |
| 2018/0144139 | A1 | 5/2018 | Cheng et al. |
| 2018/0165554 | A1 | 6/2018 | Zhang et al. |
| 2018/0234443 | A1 | 8/2018 | Wolkov et al. |
| 2018/0248895 | A1 | 8/2018 | Watson et al. |
| 2018/0288063 | A1 | 10/2018 | Koottayi et al. |
| 2019/0034641 | A1 | 1/2019 | Gil et al. |
| 2019/0334784 | A1 | 10/2019 | Kvernvik et al. |
| 2020/0021607 | A1 | 1/2020 | Muddu et al. |
| 2020/0082098 | A1 | 3/2020 | Gil et al. |

OTHER PUBLICATIONS

DatumBox Blog, "Machine Learning Tutorial: The Naïve Bayes Text Classifier", DatumBox Machine Learning Blog and Software Development News, Jan. 2014, pp. 1-11.

Freeman, David, et al., "Who are you? A Statistical Approach to Measuring User Authenticity", NDSS, Feb. 2016, pp. 1-15.

Malik, Hassan, et al., "Automatic Training Data Cleaning for Text Classification", 11th IEEE International Conference on Data Mining Workshops, 2011, pp. 442-449.

Wang, Alex Hai, "Don't Follow Me Spam Detection in Twitter", International Conference on Security and Cryptography, 2010, pp. 1-10.

Chen, Jinghui, et al., "Outlier Detection with Autoencoder Ensembles", Proceedings of the 2017 SIAM International Conference on Data Mining, pp. 90-98.

* cited by examiner

DYNAMIC RULE RISK SCORE DETERMINATION IN A CYBERSECURITY MONITORING SYSTEM

RELATED APPLICATIONS

This application claims the benefit of U.S. Provisional Application No. 62/481,778, filed on Apr. 5, 2017, and titled "Dynamic Rule Risk Score Determination," the contents of which are incorporated by reference herein as if fully disclosed herein.

BACKGROUND OF THE INVENTION

1. Field of the Invention

This invention relates generally to security analytics in computer networks, and more specifically to dynamically determining rule risk scores in a cybersecurity monitoring system.

2. Description of the Background Art

Fraud or cybersecurity monitoring systems conventionally rely on rules to detect sessions of interest. For each user session, cybersecurity monitoring systems evaluate a set of rules based on user activity in a session. Anomalous user activity typically will cause one or more rules to trigger, as malicious activities often manifest themselves in anomalous changes from historical habitual patterns.

Each rule is associated with a score, and, if a rule is triggered during a session, that rule's score is added to the user's session score. The sum of the scores for triggered rules is the final score for the session. A session with a final score over a threshold is presented to analysts for review.

One challenge for rule-based systems is uncontrolled inflation of the final session score due to high false-positive rates with some rules. When rules trigger frequently across sessions in a network, they generally inflate the scores across the board. This makes the threshold-setting difficult.

There is a need for a method to reduce a rule's score if it is observed to trigger across many different sessions in a particular network. However, rules may have different false positive rates in different networks. Therefore, a threshold tuned in one network need not apply to another.

Furthermore, conventional rule-based systems have no ability to learn how a rule behaves on a per-user basis. If a rule tends to trigger often for a particular network user, this rule will continue to trigger on the user in the future. This rule is deemed to have high false positive for the concerned user, but it is not necessarily so for other users. This results in score inflation for this particular user's sessions. Therefore, there is a need for a per-user-and-rule score discounting scheme to reduce the score inflation.

SUMMARY OF THE DISCLOSURE

The present disclosure relates to a cybersecurity monitoring system, method, and computer program for dynamically determining a rule's risk score based on the network and user for which the rule triggered. The methods described herein addresses score inflation problems associated with the fact that rules have different false positive rates in different networks and for different users, even within the same network. In response to a rule triggering, the system dynamically adjusts a default risk points associated with the triggered rule based on a per-rule and per-user probability that the rule triggered due to malicious behavior.

To calculate the aforementioned probability for each rule-user pair, the security-monitoring system ("the system") first assesses "a global risk" probability for each rule in the applicable network/environment. A rule's global risk probability is the network-wide probability that the rule triggered due to malicious behavior. The method accounts for frequency of a rule's triggering across all entities in the network, and the more frequently a rule triggers, the lower the global risk probability for the rule. This risk is a global risk since it is derived from the entire population in the network.

For each user-rule pair in the system (or in an applicable set of rules), the system then calculates a "local risk" probability using: (1) the global risk probability for the rule, and (2) the rule's triggering history for the user. The local risk probability is the probability that a rule triggered for a user due to malicious behavior. The method accounts for frequency of a rule's triggering in the past user history, and the more frequently a rule triggers for a user, the lower the local risk probability for the rule-user pair. The local risk probability for a rule is customized per user. This risk is a local risk since it is derived in a user's local context. The rule's global risk is utilized in the process of calculating the local risk probability for each rule-user pair.

In certain embodiments, both the global and local risk probabilities also factor in context within a network environment. In these embodiments, the global risk probability is based on the frequency in which a rule triggers in a particular context, and the local risk probability for a user/rule pair is based on the global risk and the user's history in the particular context.

In future triggering of a rule for a user, instead of assigning a default, fixed score to the rule, a user-specific (and, in some cases, context-specific) dynamic score is assigned to the rule by adjusting the default risk score of the rule in accordance with the local risk probability of the applicable user-rule pair (and, in some cases, network context). If a user-specific risk score in not available because a rule has never triggered for a user (or at least not triggered during a training period), the global risk probability is used as the anchor to adjust the rule's risk score. If a rule never triggers for any user during a training period, the default risk score is used.

This method can dramatically reduce the common problem of score inflation in a conventional rule-based system. Less-than-useful alerts due to common triggering of some rules are suppressed. More interesting alerts with varied rules triggering can rise in ranks, resulting in better overall malicious-behavior detection.

DETAILED DESCRIPTION OF THE PREFERRED EMBODIMENTS

The present disclosure describes a system, method, and computer program for dynamically determining a cybersecurity rule risk score based on the network and user for which the rule triggered. The method is performed by a computer system that detects cyber threats in a network and performs a risk assessment of user network activity ("the system"). The system may be a user behavior analytics (UBA) system or a user-and-entity behavior analytics system (UEBA). An example of a UBA/UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

As context for the methods described herein, the system scores user activity in a network for potential malicious behavior. More specifically, the system evaluates user sessions in view set of rules and, for each user session, determines whether any rules are triggered as a result of the session. A "user session" may be a user logon session, a time period in which user activity is evaluated, or other grouping of user activity. Each of the evaluated rules is associated with a rule score, and, if a rule is triggered during the session, the rule's score is added to the user's session score. The methods described herein relate to dynamically adjusting the rule's score based on the network, user, and, in some cases, network context in which or for which the rule triggered. The sum of the scores for triggered rules is the final score for the session. The system raises an alert for user sessions with scores above a threshold.

The methods described herein achieve the following objectives:
1. Reduction of rule score if the rule triggers often across many accounts.
2. Reduction of rule score if the rule triggers often on the same accounts.

The first objective calls for a global model that calculates a global risk probability for each triggered rule $r_i$. The global risk probability for rule $r_i$ triggering is notated herein as P(malice|$r_i$) or P(M|$r_i$). The second objective calls for a per-account personal model that calculates a local risk probability for each triggered rule $r_i$ by user u. The local risk probability for rule $r_i$ triggering is notated herein as P(malice|$r_i$, U) or P(M|$r_i$, u). In the methods described herein, the two objectives are combined seamlessly. This is done leveraging the global model as a conjugate prior for the personal model. In other words, the global posterior P(malice|$r_i$) is used as the prior in calculating the personal posterior P(malice|$r_i$, u).

Figure 1:
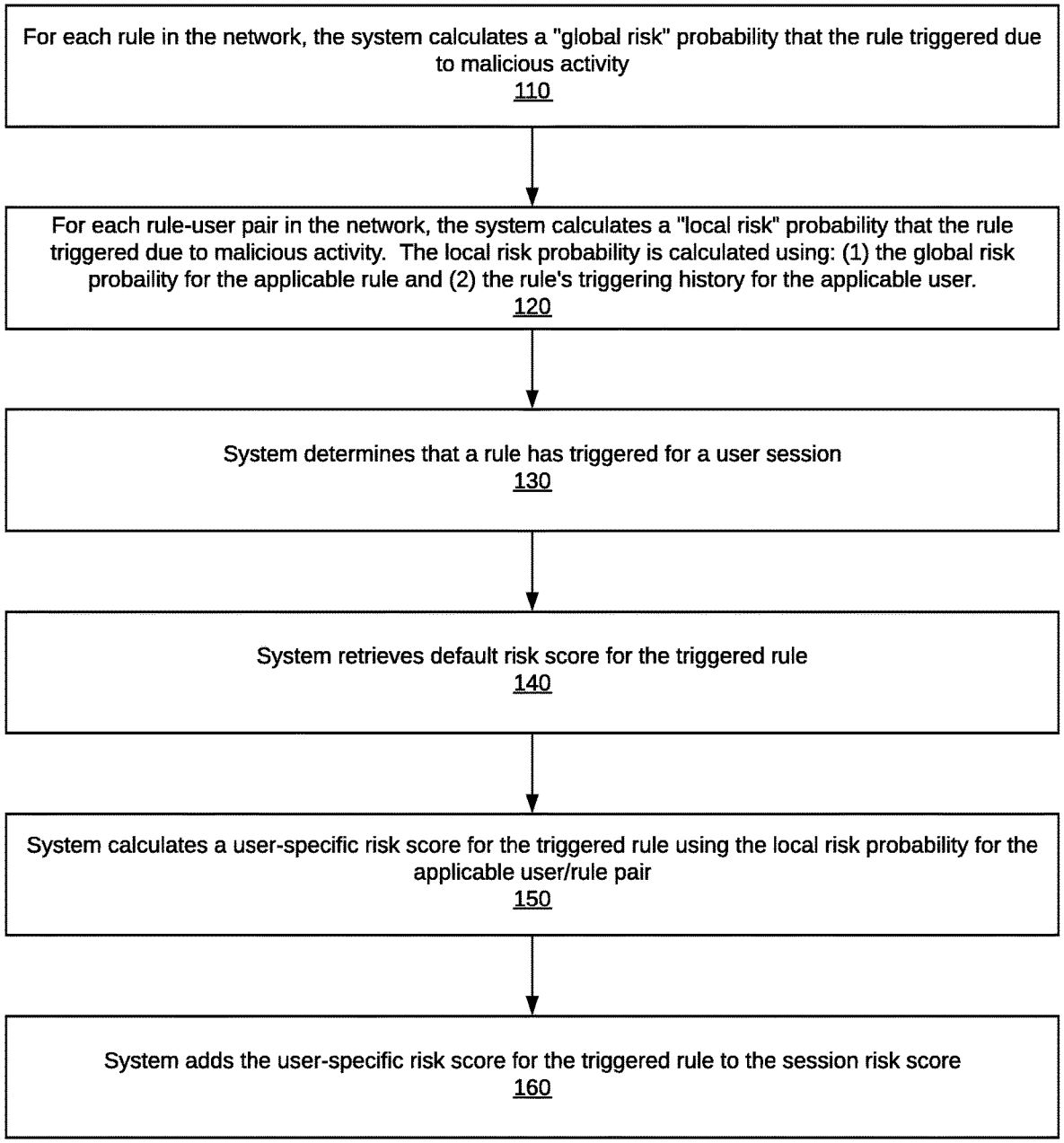
FIG. 1 is a flowchart that illustrate a method, according to one embodiment, for dynamically determining a rule risk score based on the network and user for which the rule triggered.
Figure 2:
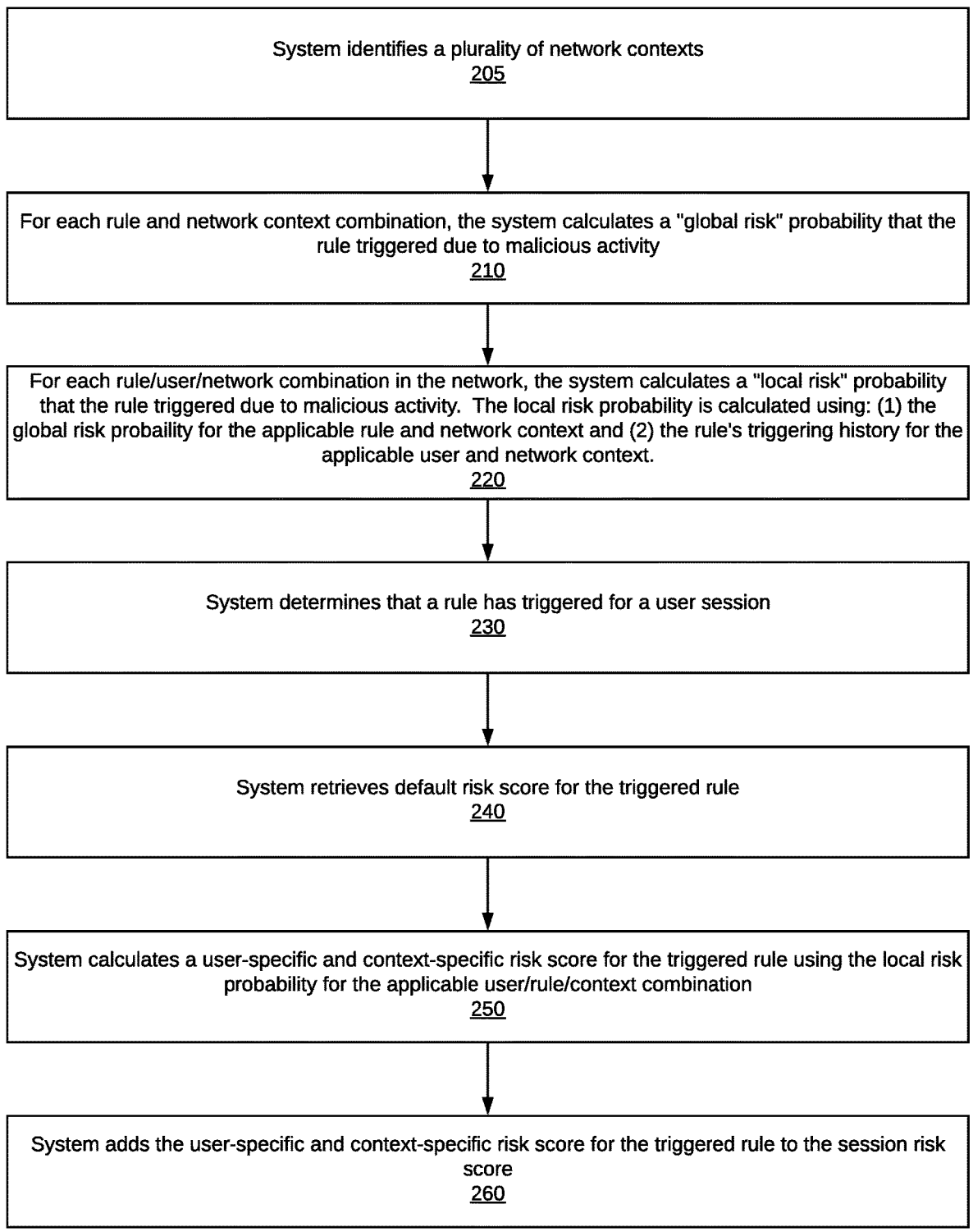
FIG. 2 is a flowchart that illustrate a method, according to one embodiment, for dynamically determining a rule risk score based on the network context and user for which the rule triggered.

FIG. 1 illustrates one embodiment of the method in which the rule score is adjusted based on the network in and the user for which the rule triggered. FIG. 2 illustrates an alternate embodiment in which network context is also a factor in adjusting a rule's risk score.

With respect to the method of FIG. 1, the system first calculates "a global risk" probability for each rule in the applicable network/environment (step 110). A rule's global risk probability is the probability that the rule triggered due to malicious behavior based on the rule's triggering history across all users in the network. The global risk probability reflects the frequency of a rule's triggering across all users in the network, and the more frequently a rule triggers, the lower the global risk probability for the rule. This risk is a global risk since it is derived from the entire population in the network.

Second, for each user and each rule in the system, the system calculates a "local risk" probability for the user-rule pair using: (1) the global risk probability for the applicable rule, and (2) the rule's triggering history for the applicable user (step 120). The local risk probability is the probability that a rule triggered for the particular user due to malicious behavior. The local risk probability reflects the frequency of a rule's triggering both network wide and for the particular user. The more frequently a rule triggers for a user, the lower the local risk probability for the corresponding rule-user pair. The local risk probability for a rule is customized per user. This risk is local risk since it is derived in a user's local context. The rule's global risk is utilized in the process of calculating the local risk probability for each rule-user pair. In one embodiment, the data used to calculate the local and global risk probabilities is gathered over a training period, such as two weeks or one month. The training data and the corresponding risk probabilities may be updated periodically or on a sliding window basis.

In a future triggering of a rule during a user session, the system dynamically adjusts the risk score of the rule based on the local risk probability for the applicable rule-user pair. Each rule has a starting, default risk score. When a rule triggers, the system retrieves the default score associated with the triggered rule and dynamically adjusts the rule's score using the applicable local risk probability (steps 130-150). The resulting rule score is specific to the user (as well as specific to the rule). In one embodiment, the local risk probability ranges from 0 to 1, and the adjusted risk score is obtained by multiplying the default score by the local risk probability. The adjusted risk score is added to session risk score for the applicable user session (step 160).

In one embodiment, a Bayesian formula is used to calculate the global and local risk probabilities. For example, the following formula may be used to calculate the global risk probability:

Global Risk for rule $r_i$ triggering:

$$P(M \mid r_i) = \frac{P(r_i \mid M)P(M)}{P(r_i \mid M)P(M) + P(r_i \mid L)P(L)},$$

$$P(M) = P(L) = 0.5$$

P(M|$r_i$) denotes the global risk probability for rule in the formulas herein stands for a legitimate session, and "M" in the formulas herein stands for a malicious session. P($r_i$|M) is 1/N where N is the number of unique observed triggered rules. P($r_i$|L) is number of unique sessions (or users) $r_i$ is observed divided by number of sessions (or users) an is observed. In one embodiment, since P(M) and P(L) are unknown, they are set to 0.5 (i.e., equal probability of either a legitimate or a malicious session), but those skilled in the art will appreciate that other values could be used as necessary to optimize the rule scores.

If the system monitors more than one network, the global risk probability is calculated for each network monitored by the system, as the frequency in which rules trigger can vary across networks.

In one embodiment, the local risk probability is calculated for each rule-user pair in a network using the following Bayesian formula:

Local Risk for rule $r_i$ triggering for user u:

$$P(M \mid r_i, u) = \frac{P(r_i \mid M, u)P(M \mid r_i)}{P(r_i \mid M, u)P(M \mid r_i) + P(r_i \mid L, u)P(L \mid r_i)}$$

P(M|$r_i$, u) denotes the local risk probability for rule $r_i$ and user u. P(M|$r_i$) is the global risk probability for the rule.

$P(L|r_i)=1-P(M|r_i)$. $P(r_i|M, u)$ is $1/M$ where M is the number of observed triggered rules in the account's history. $P(r_i|L, u)$ is the number of times $r_i$ is observed in the account's history divided by number of any $r_i$ in history.

In certain embodiments, both the global and local risk probabilities also factor in context within a network environment. In these embodiments, the global risk probability is based on the frequency in which a rule triggers in a particular context, and the local risk probability for a user/rule pair is based on the context-specific global risk and the user's history in a particular context. A "network context" for a rule is defined by the data source on which the rule is evaluated. For example, assume a particular rule may trigger due to an event on a work station or an event on a server. In this example, there are two different network contexts for the rule: workstations and servers.

As stated above, FIG. 2 illustrates a method for dynamically adjusting a risk score for a user session, factoring in the user history and the network contexts. The method is performed with respect to rules that can trigger in different network contexts. For each of such rules, the system first calculates a context-specific global risk probability for each network context in which the rule can trigger (steps 205, 210). A rule's context-specific global risk probability is the probability that the rule triggered due to malicious behavior in the specific network context. It is based on the rule's triggering history, across all users, in the network context. This risk probability is context-specific, but not user specific. Different rules can be associated with different network contexts.

Second, for each user/rule/context combination, the system calculates a local risk probability for the combination using: (1) the context-specific global risk probability for the applicable rule, and (2) the rule's triggering history for the applicable user in the applicable network context (step 220). The local risk probability for the combination is the probability that the applicable rule triggered for the applicable user in the applicable network context due to malicious behavior.

In one embodiment, the data used is calculate the context-specific local and global risk probabilities is gathered over a training period, such as two weeks or one month. The training data and the corresponding risk probabilities may be updated periodically or on a sliding window basis.

In a future triggering of a rule during a user session, the system dynamically adjusts the risk score of the rule based on the local risk probability for the applicable rule/user/ combination. As stated above, each rule has a starting, default risk score. When a rule triggers, the system retrieves the default score associated with the triggered rule and dynamically adjusts the rule's score using the applicable context-specific and user-specific local risk probability (steps 230-250). This results in a risk score for the rule that is customized for the user and the network context. In one embodiment, the local risk probability ranges from 0 to 1, and the adjusted risk score is obtained by multiplying the default score by the context-specific and user-specific local risk probability. The user-specific and context-specific risk score for the triggered rule is added to session risk score for the applicable user session (step 260).

In one embodiment, the global risk probability for a rule in a particular context, c, is calculated as follows:
Global Risk for rule $r_i$ triggering with context c:

$$P(M \mid r_i, c) = \frac{P(r_i, c \mid M)P(M)}{P(r_i, c \mid M)P(M) + P(r_i, c \mid L)P(L)}$$

Where:
$P(M)=P(L)=03$
$P(r_i, c|L)=P(c|r_i, L)P(r_i|L)$
$P(r_i, c|M)=P(c|r_i, M)P(r_i|M)$
$P(M|r_i, c)$ denotes the global risk probability for the rule $r_i$-context c pair. If c was not seen in the trigger history of the rule, or if $P(M|r_i,c)$ is not available, $P(M|r_i)$ is used.

In one embodiment, the local risk probability for a rule $r_i$ and user u in a particular context, c, is calculated as follows:

$$P(M \mid r_i, c, u) = \frac{P(r_i, c \mid M, u)P(M \mid r_i, c)}{P(r_i, c \mid M, u)P(M \mid r_i, c) + P(r_i, c \mid L, u)P(L \mid r_i, c)}$$

Where:
$P(r_i, c|u, L)=P(c|r_i, u, L)P(r_i|u, L)$
$P(r_i, c|u, M)=P(c|r_i, u, M)P(r_i, u, M)$
$P(M|r_i, c, u)$ denotes the local risk probability for the combination of rule $r_i$, user u, and network context c.

For certain account/rule combinations, a context-specific and user-specific local risk probability may be available. This may be the case when the rule has a history of triggering for the user in the applicable network context during the training period. For other account/rule combinations in the same network, only a user-specific (but not context-specific) local probability may be available. This may be the case when the rule has triggered for the user during the training period, but not in the applicable network context. In yet other account/rule combinations, only a global risk probability is availability. This may be the case when the applicable rule did not trigger for the user during the training period. Therefore, the type of "anchor" used to customize a rule's risk score for a session can vary, depending on what type of global or local risk probabilities are available for the particular user/rule pair|context combination at issue. In one embodiment, the system selects the anchor for a calculating a risk score during user session in accordance with the following priorities:

Dynamic Risk Score=Default risk score*$P(M|r_i,c,u)$,
if $P(M|r_i,c,u)$ is available; otherwise, Dynamic Risk Score=Default Risk Score*$P(M|r_i,u)$,
if $P(M|r_i,u)$ is available; otherwise, Dynamic Risk Score=Default Risk Score*$P(M|r_i)$, if $P(M|r_i)$ is available; otherwise, Dynamic Risk Score=Default Risk Score if $P(M|r_i)$ is not available.

Figure 3:
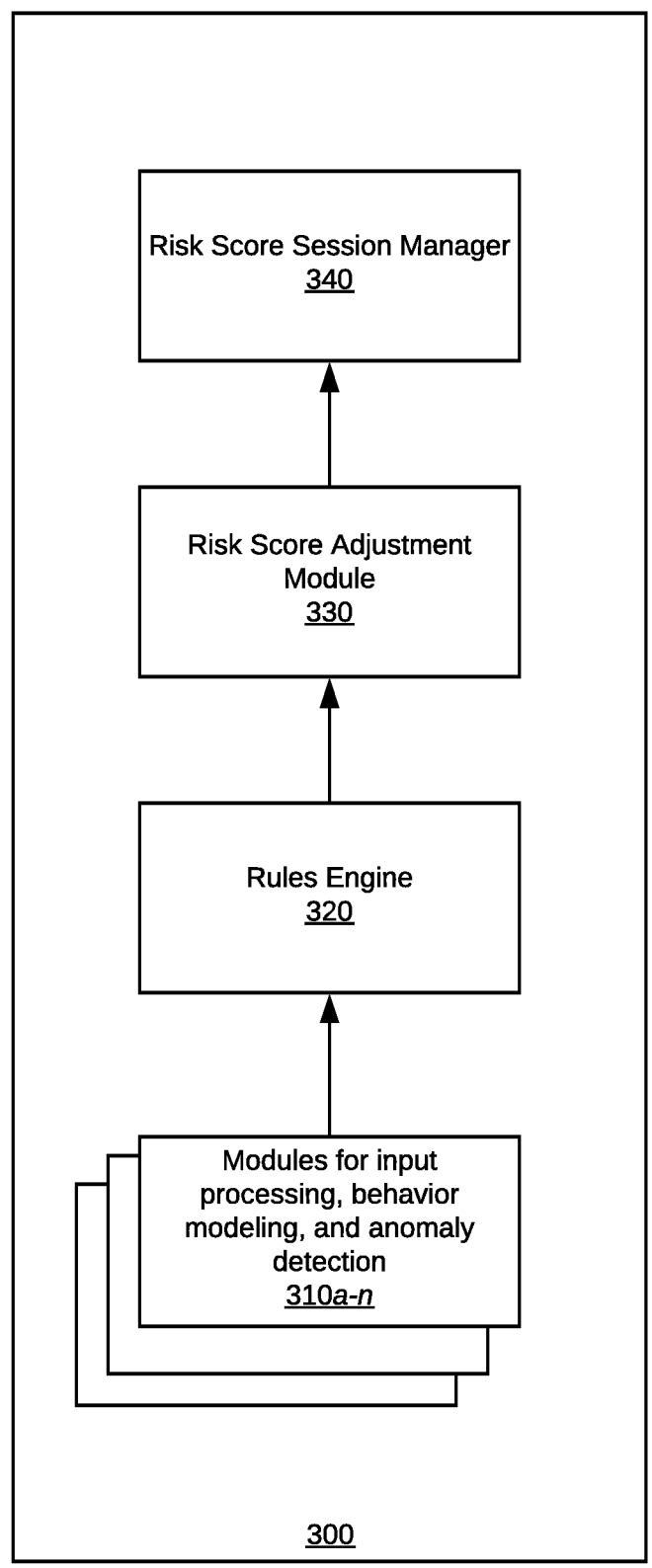
FIG. 3 is a block diagram that illustrates an example software architecture according to one embodiment.

FIG. 3 illustrates an example system for performing the methods described herein. The methods described herein may be implemented in other systems and are not limited to system 300. The system 300 includes various modules 310a-n for processing event logs and other input data, building behavior models, and performing anomaly detection. An example of these modules is described in U.S. Pat. No. 9,798,883, which is incorporated by reference above. A Rules Engine 320 receives input from one or more of the modules 310a-n, and determines whether any rules are triggered during a user session. In response to a rule triggering, a Risk Score Adjustment module 330 identifies the applicable anchor (i.e., the applicable the local or global risk probability) for calculating a risk score for the triggered rule and calculates the risk score accordingly. The Risk Score Adjustment module 330 provides the risk score to the Risk Score Session Manager module 340, which adds the adjusted risk points to the user's session risk score. At the end of or during a user logon session, the Risk Session Manager outputs flagged/high risk session scores in a user interface (not shown) for a security analyst or system administrator.

The methods are described herein with respect to a per-rule and per-user scheme to reduce score inflation. However, the methods can be applied to any network entity for which a rule may trigger.

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A non-transitory computer-readable medium comprising a computer program, that, when executed by a computer system, enables the computer system to perform the following method for dynamically determining a rule's risk score based on the computer network and user for which the rule triggered, wherein the computer system scores user sessions in a computer network for cybersecurity risks based on whether one or more of a set of rules trigger during a user session, the method comprising:
    calculating a global risk probability of the rule triggering due to malicious behavior for each of the rules, wherein a rule's global risk probability is based on the rule's triggering history across all users in a computer network;
    calculating a local risk probability of the rule triggering for the user due to malicious behavior for each rule-user pair, wherein the local risk probability is based on the rule's global risk probability and the rule's triggering history for the user;
    determining that a rule has triggered for a user during a user session;
    obtaining a default risk score for the triggered rule;
    calculating a user-specific risk score for the triggered rule, wherein the user-specific risk score is based on the default risk score and the local risk probability for the applicable user-rule pair;
    adding the user-specific risk score to a session risk score for the user session; and
    outputting the session risk score in a user interface when the session risk score indicates a high risk.

2. The non-transitory computer-readable medium of claim 1, wherein each of the local and global risk probabilities range from zero to one, and wherein calculating the user-specific risk score comprises multiplying the default risk score of the triggered rule by the local risk probability for the applicable user-rule pair.

3. A non-transitory computer-readable medium comprising a computer program, that, when executed by a computer system, enables the computer system to perform the following method for dynamically determining a rule's risk score based on the network context and user for which the rule triggered, wherein the computer system scores user sessions for cybersecurity risks based on whether one or more of a set of rules trigger during a user session, the method comprising:
    identifying a plurality of network contexts in which the rule triggers in the computer network for each rule in the set of rules;
    calculating a context-specific global risk probability that the rule triggered due to malicious behavior for each rule and network context combination, wherein a rule's context-specific global risk probability is based on the rule's triggering history in the network context across all users in the computer network;
    calculating a local risk probability that the rule triggered for the user in the network context due to malicious behavior for each rule, user, and network context combination, wherein the local risk probability is based on (1) the context-specific global risk probability for the rule and (2) the rule's triggering history for the user in the network context;
    determining that a rule has triggered for a user in one of the network contexts in a user session;
    obtaining a default risk score for the rule;
    calculating a context-specific and user-specific risk score for the rule for use in the user session, wherein the context-specific and user-specific risk score is based on the default risk score and the local risk probability for the applicable user, rule, and network context combination;
    adding the context-specific and user-specific risk score to a session risk score for the user session; and
    outputting the session risk score in a user interface when the session risk score indicates a high risk.

4. The non-transitory computer-readable medium of claim 3, wherein each of the local and global risk probabilities range from zero to one, and wherein calculating the context-specific and user-specific risk score comprises multiplying the default risk score of the triggered rule by the local risk probability for the applicable user-rule-context combination.

5. A non-transitory computer-readable medium comprising a computer program, that, when executed by a computer system, enables the computer system to perform the following method for dynamically determining a rule's risk score based on the computer network and user for which the rule triggered, wherein the computer system scores user sessions in a computer network for cybersecurity risks based on whether one or more of a set of rules trigger during a user session, the method comprising:
    determining that a rule has triggered for a user in a user session;
    obtaining a default risk score for the rule;
    calculating an adjusted risk score for the triggered rule for use in the user session, wherein the adjusted risk score is based on the default risk score and a probability that the rule triggered due to malicious behavior, wherein the probability is calculated as follows:
        in response to the rule having previously triggered for the user in a same network context, the probability is specific to the user and the network context;
        in response to the rule having previously triggered for the user but context-specific data is not available, the probability is specific to the user, but based on network-wide data;
        in response to the rule having not previously triggered for the user, the probability is based only on network-wide data across a user population; and in response to the rule having no history of triggering in the computer network, the adjusted risk score is the same as the default risk score;

adding the adjusted risk score to a session risk score for the user; and outputting the session risk score in a user interface when the session risk score indicates a high risk.

6. The non-transitory computer-readable medium of claim 5, wherein the probability ranges from zero to one, and wherein calculating the adjusted risk score comprises multiplying the default risk score of the triggered rule by the probability.

7. A method for dynamically determining a rule's risk score based on the computer network and user for which the rule triggered, wherein the method is performed by a computer system that scores user sessions in a computer network for cybersecurity risks based on whether one or more of a set of rules trigger during a user session, the method comprising:

calculating a global risk probability of the rule triggering due to malicious behavior for each of the rules, wherein a rule's global risk probability is based on the rule's triggering history across all users in a computer network;

calculating a local risk probability of the rule triggering for the user due to malicious behavior for each rule-user pair, wherein the local risk probability is based on the rule's global risk probability and the rule's triggering history for the user;

determining that a rule has triggered for a user during a user session;

obtaining a default risk score for the triggered rule;

calculating a user-specific risk score for the triggered rule, wherein the user-specific risk score is based on the default risk score and the local risk probability for the applicable user-rule pair;

adding the user-specific risk score to a session risk score for the user session; and outputting the session risk score in a user interface when the session risk score indicates a high risk.

8. The method of claim 7, wherein each of the local and global risk probabilities range from zero to one, and wherein calculating the user-specific risk score comprises multiplying the default risk score of the triggered rule by the local risk probability for the applicable user-rule pair.

9. A computer system for dynamically determining a rule's risk score based on the network context and user for which the rule triggered, wherein the computer system scores user sessions for cybersecurity risks based on whether one or more of a set of rules trigger during a user session, the system comprising:

one or more processors;

one or more memory units coupled to the one or more processors, wherein the one or more memory units store instructions that, when executed by the one or more processors, cause the system to perform the operations of:

identifying a plurality of network contexts in which rules trigger in the computer network;

calculating a context-specific global risk probability that the rule triggered due to malicious behavior for each rule and network context combination, wherein a rule's context-specific global risk probability is based on the rule's triggering history in the network context across all users in the computer network;

calculating a local risk probability that the rule triggered for the user in the network context due to malicious behavior for each rule, user, and network context combination, wherein the local risk probability is based on (1) the context-specific global risk probability for the rule and (2) the rule's triggering history for the user in the network context;

determining that a rule has triggered for a user in one of the network contexts in a user session;

obtaining a default risk score for the rule;

calculating a context-specific and user-specific risk score for the rule for use in the user session, wherein the context-specific and user-specific risk score is based on the default risk score and a local risk probability for the applicable user, rule, and network context combination;

adding the context-specific and user-specific risk score to a session risk score for the user session; and outputting the session risk score in a user interface when the session risk score indicates a high risk.

10. The system of claim 9, wherein each of the local and global risk probabilities range from zero to one, and wherein calculating the context-specific and user-specific risk score comprises multiplying the default risk score of the triggered rule by the local risk probability for the applicable user-rule pair.

* * * * *